United States Patent [19]

Heller et al.

[11] Patent Number: 4,705,637
[45] Date of Patent: Nov. 10, 1987

[54] PROCESS FOR REDUCING THE WASH WATER REQUIREMENT OF WEAKLY BASIC ANION EXCHANGERS

[75] Inventors: Harold Heller, Cologne; Peter M. Lange, Leverkusen; Friedrich Martinola, Cologne, all of Fed. Rep. of Germany

[73] Assignee: Bayer Aktiengesellschaft, Leverkusen, Fed. Rep. of Germany

[21] Appl. No.: 740,089

[22] Filed: May 31, 1985

[30] Foreign Application Priority Data

Jun. 15, 1984 [DE] Fed. Rep. of Germany ....... 3422242

[51] Int. Cl.$^4$ .......................... B01J 49/00; C02F 1/42
[52] U.S. Cl. .................................... 210/670; 210/677; 210/683
[58] Field of Search ............... 127/46.2; 210/664, 670, 210/672, 677, 683; 521/26

[56] References Cited

U.S. PATENT DOCUMENTS

| | | | |
|---|---|---|---|
| 2,354,172 | 7/1944 | Myers et al. | 210/24 |
| 3,887,391 | 6/1975 | Schoenrock et al. | 127/46.2 |
| 3,982,956 | 9/1976 | Schoenrock et al. | 210/677 |
| 4,247,340 | 1/1981 | Cartier | 127/46.2 |

FOREIGN PATENT DOCUMENTS

| | | |
|---|---|---|
| 759180 | 8/1951 | Fed. Rep. of Germany . |
| 1063986 | 2/1955 | Fed. Rep. of Germany . |
| 1767584 | 9/1971 | Fed. Rep. of Germany . |
| 2055000 | 7/1971 | France . |

OTHER PUBLICATIONS

European Search Report.
Chemical Abstracts, vol. 78, 1973, p. 233.
Japanese Abstract, vol. 6, No. 68, 4/30/82 (1 page), BolJ49/00.
Translation, Jap. Abs., vol. 6, No. 68, 4/30/82 pp. 1–6.
Rohm and Haas, Philadelphia, Amberlite IRA-93 (2 pgs.).

Primary Examiner—Ivars Cintins
Attorney, Agent, or Firm—Sprung Horn Kramer & Woods

[57] ABSTRACT

The invention relate to a process for reducing the wash water required by weakly basic anion exchangers containing primary and/or secondary amino groups when fed with water containing carbon dioxide; in accordance with the process the exhausted, weakly basic anion exchangers are treated with dilute aqueous mineral acids before being regenerated.

5 Claims, No Drawings

PROCESS FOR REDUCING THE WASH WATER REQUIREMENT OF WEAKLY BASIC ANION EXCHANGERS

According to the information provided by manufacturers of ion exchangers, strongly basic and weakly basic anion exchangers require about 5 to 10 bed volumes (bed volume=volume of the anion exchanger) of wash water to remove from the anion exchangers the sodium hydroxide solution used for regeneration. Usually, an anion exchanger is considered to be adequately washed out when the conductivity of the wash water emerging from it has fallen to 50 $\mu$S/cm. Also, in certain cases, residual conductivity values of only 10 $\mu$S/cm in the wash water emerging may be demanded. In these cases the requirement of wash water rises to 8 to 12 bed volumes.

Weakly basic anion exchangers have the disadvantageous property that the amount of wash water which they require can vary during their use and, specifically, can increase when the loading water contains certain substances.

Thus, for example, an increase in the requirement of wash water is observed in the case of weakly basic anion exchangers containing tertiary amino groups when the loading water contains certain compounds containing carboxyl groups. Weakly basic anion exchangers containing primary and/or secondary amino groups exhibit a considerable increase in the amount of wash water which they require when the water used for loading them contains carbon dioxide. If loading water containing carbon dioxide is used, the amount of wash water required in order to achieve the desired residual conductivity of 50 $\mu$S/cm in the emerging wash water increases, after only a few loading cycles, from 5-10 bed volumes to 25-40 bed volumes. The increase in the amount of wash water required results in an undesirable prolongation of the regeneration time and—since the anion exchanger inevitably becomes charged with the anions in the wash water—also results in a reduction in the effective capacity of the anion exchanger.

It has now been found, surprisingly, that an increase in the amount of wash water required by weakly basic anion exchangers containing primary and/or secondary amino groups when loaded with water containing carbon dioxide can be avoided by treating the exhausted (=completely loaded) anion exchangers with dilute aqueous mineral acids before they are regenerated with sodium hydroxide solution.

The invention relates, therefore, to a process for reducing the amount of wash water required by weakly basic anion exchangers containing primary and/or secondary amino groups when loaded with water containing carbon dioxide, which is characterised in that the exhausted anion exchangers are treated with dilute aqueous mineral acids before they are regenerated.

Suitable dilute aqueous mineral acids are, above all, dilute aqueous hydrochloric acid, dilute aqueous nitric acid and dilute aqueous sulphuric acid. The concentration of the mineral acids in the dilute aqueous solutions is preferably about 0.5 to 10% by weight. Instead of dilute aqueous solutions of pure acids, it is also possible to use regeneration agent effluents, containing mineral acid, from cation exchangers.

The dilute aqueous solutions of mineral acids to be used in accordance with the invention are employed in an amount such that at least 0.25 equivalents of mineral acid, preferably 0.35 to 1.0 equivalent of mineral acid are used per equivalent of effective capacity of the weakly basic anion exchanger. Although larger amounts of mineral acid can be used, they do not afford any further advantage. The reactivating action of sulphuric acid is somewhat weaker than that of hydrochloric acid and nitric acid; thus, if sulfuric acid is used, the upper range of the equivalent range indicated will be given preference. whereas if hydrochloric acid or sulfuric acid is used, the lower range will be given preference.

The acid treatment according to the invention of the exhausted, weakly basic anion exchangers containing primary and/or secondary amino groups is carried out by filtering the dilute aqueous mineral acids through the completely loaded, weakly basic anion exchangers at the flow rates customary in the technology of anion exchangers.

The treatment, according to the invention, of the weakly basic anion exchangers with aqueous mineral acid solutions before regeneration with sodium hydroxide solution differs from the treatment, described in German Offenlegungsschrift No. 1,767,584, of partially saturated, weakly basic anion exchangers with aqueous mineral acid solutions (a) in purpose and (b) in execution. The process described in German Offenlegungsschrift No. 1,767,584 relates to achieving the technical object of neutralising acid and alkaline regeneration agent effluents from ion exchangers in an economical manner. In contrast, the process according to the invention relates to achieving the technical object of reducing the wash water requirement of weakly basic anion exchangers which contain primary and/or secondary amino groups and are loaded with water containing carbon dioxide. As a consequence of their differing objects, the two processes are carried out in different ways:

According to the process described in German Offenlegungsschrift No. 1,767,584, partially loaded, weakly basic anion exchangers are treated with aqueous solutions containing mineral acid until they are completely loaded and are then regenerated; in contrast, in the process according to the invention, completely loaded weakly basic anion exchangers are subjected to the acid treatment according to the invention and then to regeneration. The sole aim and achievement of the acid treatment according to German Offenlegungsschrift No. 1,767,584 is to make use of the still unconsumed capacity of the anion exchangers for neutralising the mineral acid contained in the cation exchanger effluents. In contrast, in the acid treatment according to the invention, no neutralisation of acids takes place at all, nor can it take place, because the capacity of the anion exchangers is already fully used up before the acid treatment begins.

The possibilities of using weakly basic anion exchangers containing primary and/or secondary amino groups for removing salts from aqueous solutions containing carbon dioxide are considerably improved by means of the process according to the invention. The reason why the use of weakly basic anion exchangers containing primary and/or secondary amino groups in plants for removing salts from water containing carbon dioxide is of great practical interest is that these weakly basic anion exchangers in most cases have a considerably higher effective capacity than the weakly basic anion exchangers containing tertiary amino groups, and that the water to be treated in salt removal plants very often contains carbon dioxide. Hitherto the increase in the wash water requirement associated with the use of weakly basic anion exchangers containing primary and/or secondary amino groups, and the decline, associated therewith, in their effective capacity, have been an obstacle to the use of these anion exchangers. Since dilute aqueous solutions of pure mineral acids are not required for the acid treatment, according to the invention, which prevents an increase in wash water requirement, and it is, instead, possible to use, with equal success, the regeneration effluents, containing mineral acid, from the cation exchanger arranged upstream, the process according to the invention constitutes a virtually cost-free measure.

EXAMPLES

General test conditions:

The water used for loading the weakly basic anion exchangers containing primary and/or secondary amino groups was completely freed from bases and had the following composition:

$HCl + H_2SO_4 + HNO_3$: 5 to 6 milliequivalents/l;
free $CO_2$: 110–140 mg/l.

The individual tests were each carried out with one liter of anion exchanger (measured in the regenerated state). The exchanger was located in a filter column having a diameter of 70 mm.

The anion exchanger was loaded with the abovementioned base-free water at a rate of 20 l/hour.

Starting point and end point of the loading procedure: residual conductivity of 50 $\mu S/cm$ in the effluent from the filter column.

The treatment of the loaded anion exchanger with the dilute aqueous solution of a mineral acid was carried out at a rate of 5 l/hour. After the treatment, the acid solution was expelled by means of 2 liters of base-free water.

The regeneration of the loaded and treated anion exchanger was carried out with 4% strength sodium hydroxide solution; the sodium hydroxide solution was expelled by means of 2 liters of base-free water. Following this washing was carried out with base-free wash water at a rate of 10 l/hour until the conductivity in the wash water emerging from the filter had again fallen to 50 $\mu S/cm$.

EXAMPLE 1

The weakly basic anion exchanger used contains only primary amino groups; its effective capacity (EC) is 1.4 equivalents/liter of resin. Regeneration is carried out with 3 liters of 4% strength by weight sodium hydroxide solution and loading is carried out with 280 liters of base-free water.

It can be seen from Table 1 how the wash water requirement increases with the number of loadings.

TABLE 1

| Number of loadings | Wash water requirement [l] = [Bv] |
| --- | --- |
| 1 | 7 |
| 2 | 15 |
| 3 | 20 |
| 4 | 32 |
| 5 | 38 |

After the sixth loading the weakly basic anion exchanger is treated with 100 g of 30% strength by weight hydrochloric acid (in the form of a 3% strength aqueous solution); after this acid treatment, the wash water rerequirement after the next regeneration is then only 5 liters.

EXAMPLE 2

The anion exchanger used contains primary, secondary and tertiary amino groups; its effective capacity (EC) is 2.1 equivalents/liter of resin.

Regeneration is carried out with 4 liters of 4% strength by weight sodium hydroxide solution and loading with an amount of base-free water corresponding to the effective capacity of the anion exchanger.

It can be seen from Table 2 how the wash water requirement increases with the number of loadings and how the effective capacity of the anion exchanger (=volume of base-free water which can be filtered through the anion exchanger until the residual conductivity in the effluent rises above 50 $\mu S/cm$) declines in the absence of acid treatment.

After the seventh loading the anion exchanger is treated with 200 g of 30% strength by weight hydrochloric acid (in the form of a 3% strength aqueous solution).

It can be seen from Table 2 how the wash water requirement increases, and the effective capacity of the anion exchanger decreases, as the number of loadings increases, and how the wash water requirement and effective capacity decline and increase, respectively, to their original value after the acid treatment.

TABLE 2

| Number of loadings | Effective capacity | | Wash water requirement [l] = [BV] |
| --- | --- | --- | --- |
| | *[l of base-free water] | [equivalents/ l of resin] | |
| 1 | 380 | 2.1 | 6 |
| 3 | 365 | 2.0 | 20 |
| 5 | 345 | 1.9 | 28 |
| 7 | 340 | 1.87 | 37 |
| 8 | 380 | 2.1 | 6 |

*Illustrated by the volume (l) of base-free water which can be passed through the anion exchanger until the latter is exhausted (that is to say until the residual conductivity in the effluent rises to > 50 $\mu S/cm$).

EXAMPLE 3

The weakly basic anion exchanger used in Example 2 is used. After 5 loadings of the anion exchanger without acid treatment before regeneration, its wash water requirement is 28 liters.

When the wash water requirement has risen to 28 liters, the anion exchanger is pre-treated in different tests with varying amounts of different acid before regeneration.

It can be seen from Table 3 how the wash water requirement which has risen to 28 liters varies as a function of the acid, and amount of acid, used for the pretreatment of the loaded anion exchanger. The amounts of acid indicated in Table 3 relate to 100% strength acids. The acids were, however, used in the form of dilute aqueous solutions, and specifically, hydrochlorid acid was used in the form of a 3% strength aqueous solution, nitric acid in the form of a 4% strength aqueous solution and sulphuric acid in the form of a 2% strength aqueous solution.

TABLE 3

| $H_2SO_4$ [g] | Acids (100% strength) [equivalents] | HCl [g] | (100% strength) [equivalents] | $HNO_3$ [g] | (100% strength) [equivalents] | Wash water requirement (l) |
|---|---|---|---|---|---|---|
| 0 | 0 | 0 | 0 | 0 | 0 | 28 |
| 14.4 | 0.294 | 9 | 0.247 | 15.6 | 0.247 | 21 |
| 28.8 | 0.588 | 19.5 | 0.534 | 33.6 | 0.534 | 13 |
| 57.6 | 1.196 | 36 | 0.986 | 63 | 1.00 | 9 |
| 86.3 | 1.76 | 60 | 1.65 | 105 | 1.66 | 6 |

EXAMPLE 4

The weakly basic anion exchanger used in Example 2 is employed in a salt-removal plant together with an acid cation exchanger, which is arranged upstream. After loading has taken place the cation exchanger is regenerated with hydrochloric acid. The regeneration acid leaving the cation exchanger still contains 1 equivalent of free hydrochloric acid per liter. This effluent is immediately passed through the exhausted weakly basic anion exchanger, before the latter is regenerated with sodium hydroxide solution.

Over 5 working cycles (a working cycle=loading+regeneration), the salt removal efficiency (volume of de-salted water) remained unchanged at 350 liters and the consumption of wash water remained unchanged at 5 to 6 liters. Without the pre-treatment of the anion exchanger with the acid effluent from the cation exchanger, the consumption of wash water rises to 32 liters.

What is claimed is:

1. In a process which comprises completely loading a weakly basic anion exchanger containing primary and/or secondary amino groups with water containing carbon dioxide to thereby produce an exhausted weakly basic anion exchanger, regenerating the anion exchanger, washing the anion exchanger with water, and repeating the loading step, the improvement which comprises treating the exhausted weakly basic anion exchanger with a dilute aqueous mineral acid before it is regenerated, at least 0.25 equivalents of the mineral acid being used per equivalent of effective capacity of the weakly basic anion exchanger, whereby the amount of wash water required to remove regenerant is reduced.

2. The process of claim 1, wherein the dilute aqueous mineral acid used is dilute aqueous hydrochloric acid, dilute aqueous nitric acid or dilute aqueous sulphuric acid.

3. The process of claim 1, wherein the concentration of the mineral acid in the dilute aqueous solution is 0.5 to 10% by weight.

4. The process of claim 1, wherein the mineral acid is employed in an amount such that 0.35 to 1.0 equivalents of mineral acid are used per equivalent of effective capacity of the weakly basic anion exchanger.

5. Process according to claim 1, characterised in that regeneration agent effluents, containing mineral acid, from cation exchangers are used as the dilute aqueous mineral acid.

* * * * *